United States Patent
Koga

(10) Patent No.: US 10,222,876 B2
(45) Date of Patent: Mar. 5, 2019

(54) DISPLAY CONTROL SYSTEM AND METHOD

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 15/447,617

(22) Filed: Mar. 2, 2017

(65) Prior Publication Data
US 2017/0262074 A1    Sep. 14, 2017

(30) Foreign Application Priority Data

Mar. 8, 2016    (JP) ................. 2016-044658

(51) Int. Cl.
*G06F 3/01*     (2006.01)
*G06F 3/0346*   (2013.01)
*G06T 11/60*    (2006.01)
*G06F 3/0485*   (2013.01)

(52) U.S. Cl.
CPC ............ *G06F 3/0346* (2013.01); *G06F 3/011* (2013.01); *G06F 3/012* (2013.01); *G06F 3/017* (2013.01); *G06F 3/0485* (2013.01); *G06T 11/60* (2013.01)

(58) Field of Classification Search
CPC .......... G06F 3/011; G06F 3/012; G06F 3/017; G06F 3/0485; G06F 3/147; G06T 11/60; G06T 19/006; H04S 5/005
See application file for complete search history.

(56) References Cited

U.S. PATENT DOCUMENTS

| | | | | |
|---|---|---|---|---|
| 2012/0148106 A1* | 6/2012 | Sung | ............... | G06T 19/006 382/106 |
| 2014/0285521 A1* | 9/2014 | Kimura | ............ | G06F 3/147 345/633 |
| 2015/0063610 A1* | 3/2015 | Mossner | ............ | H04S 5/005 381/307 |

FOREIGN PATENT DOCUMENTS

| | | |
|---|---|---|
| JP | 2009-294372 | 12/2009 |
| JP | 2014-235717 | 12/2014 |
| WO | WO 2013/145147 A1 | 10/2013 |

* cited by examiner

*Primary Examiner* — Richard J Hong
(74) *Attorney, Agent, or Firm* — Oblon, McClelland, Maier & Neustadt, L.L.P.

(57) ABSTRACT

A system includes a first sensor configured to measure a location of a first device, a second sensor configured to measure an orientation of a second device, a display, and a processor. The processor is configured to control the first sensor to start a first measurement, calculate distances between the location of the first device and each of a plurality of installation locations associated with each of a plurality of objects, each of the plurality of objects being arranged virtually at each of a plurality of installation locations in a real space, control the second sensor to start a second measurement when a distribution of the distances indicates that any of the plurality of installation locations of the plurality of objects is included in a given range from the first device, and control the display to display an object according to results of the first measurement and the second measurement.

17 Claims, 12 Drawing Sheets

FIG. 9

| OBJECT ID | OBJECT DATA | LOCATION INFORMATION |
|---|---|---|
| AR001 | AR-DATA001.dat | E135.xx,N35.zz,EL+30.yy |
| AR002 | AR-DATA002.dat | E135.xx,N35.zz,EL+30.yy |
| ... | ... | ... |

121

DISPLAY CONTROL SYSTEM AND METHOD

CROSS-REFERENCE TO RELATED APPLICATION

This application is based upon and claims the benefit of priority of the prior Japanese Patent Application 2016-044658, filed on Mar. 8, 2016, the entire contents of which are incorporated herein by reference.

FIELD

The embodiments discussed herein are related to augmented reality.

BACKGROUND

Recently, an augmented reality (AR) technology has been proposed by which an object is displayed superimposed on a captured image, using a display device such as a head mounted display. When displaying the object superimposed on the image in the AR, the location and the orientation of the head mounted display are detected, and the object is changed according to the detected location and the orientation. The object according to the location and the orientation of the user is thus displayed in the head mounted display superimposed on the captured image.

The technologies in the related arts are discussed, for example, in Japanese Laid-open Patent Publication No. 2009-294372, Japanese Laid-open Patent Publication No. 2014-235717, and International Publication Pamphlet No. WO2013/145147.

SUMMARY

According to an aspect of the invention, a system includes a first sensor configured to measure a location of a first device, a second sensor configured to measure an orientation of a second device, a display, and a processor. The processor is configured to control the first sensor to start a first measurement of the location, acquire the location from the first sensor, calculate, based on a result of the first measurement, distances between the location of the first device and each of a plurality of installation locations associated with each of a plurality of objects, each of the plurality of objects being arranged virtually at each of a plurality of installation locations in a real space, control the second sensor to start a second measurement of the orientation when a distribution of the distances indicates that any of the plurality of installation locations of the plurality of objects is included in a given range from the first device, acquire the orientation from the second sensor, and control the display to display an object, from among the plurality of objects, according to the result of the first measurement and a result of the second measurement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of an object data storage unit;

DESCRIPTION OF EMBODIMENTS

However, when the location and the orientation of the head mounted display are detected, the power consumption increases, and the continuous operating time of the head mounted display is reduced. Therefore, it is difficult to reduce the power consumption by the head mounted display while the head mounted display detects its location and orientation.

In one aspect, an objective of the technology discussed herein is to reduce the power consumption of a head mounted display.

Embodiments of a display control method, a communication device, a display control program, and a display control device according to the technology disclosed herein are described below in detail with reference to drawings. Note that the embodiments described herein shall not limit the disclosed technology in any way. In addition, the following embodiments may be combined as appropriate to the extent contradiction does not arise.

[Embodiments]

Figure 1:
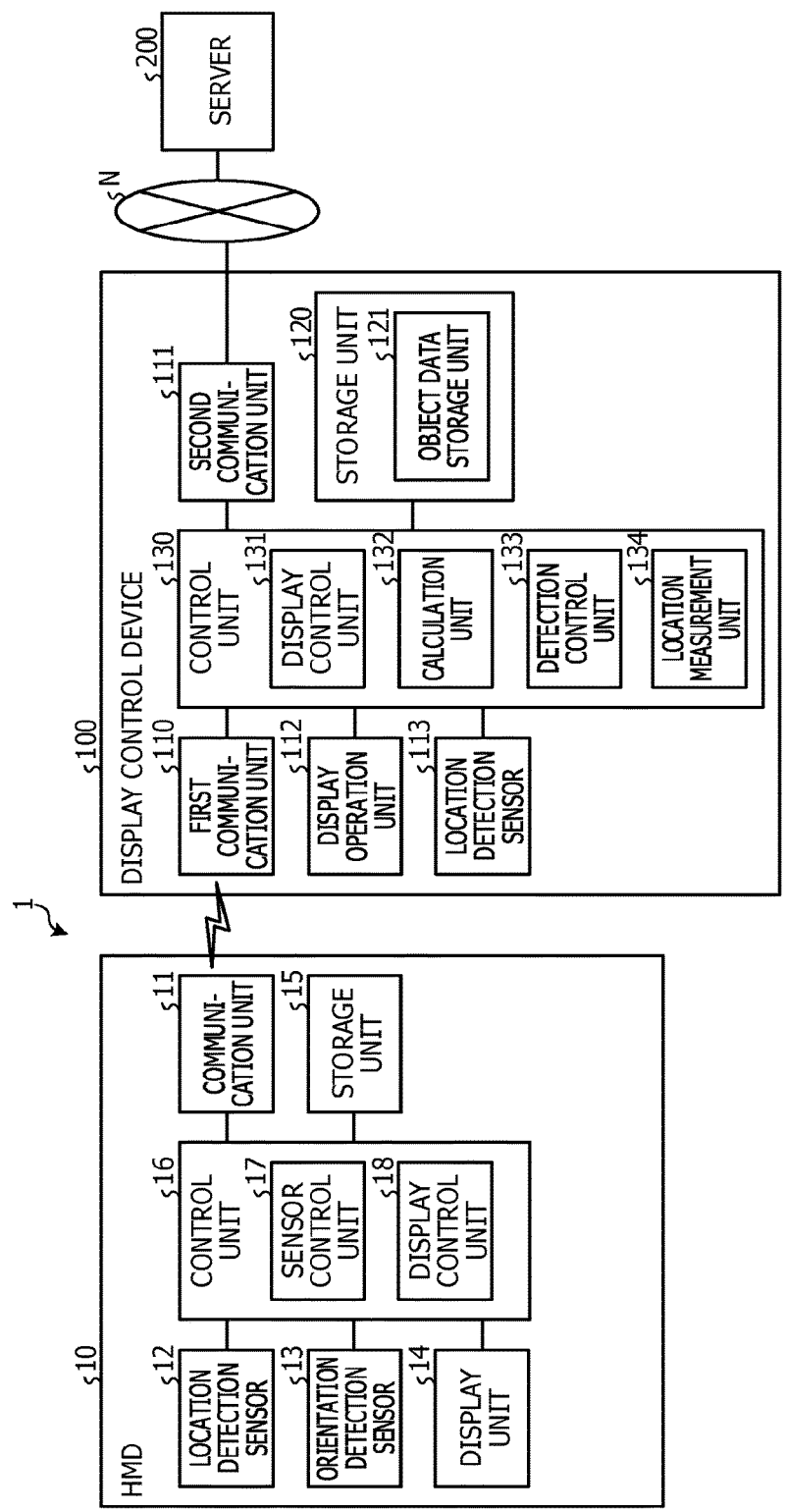
FIG. 1 is a block diagram illustrating an example of a configuration of a display control system according to an embodiment.

FIG. 1 is a block diagram illustrating an example of a configuration of a display control system according to an embodiment. A display control system 1 illustrated in FIG. 1 includes a head mounted display (hereinafter also referred to as an "HMD") 10, a display control device 100, and a server 200. The HMD 10 and the display control device 100 are coupled wirelessly or by wire one-to-one each other. Namely, the HMD 10 functions as an example of a display unit for the display control device 100. Note that the coupling of the HMD 10 and the display control device 100 is not limited to a one-to-one coupling, and may be a one-to-many, many-to-one, or many-to-many coupling. In addition, in FIG. 1, a single pair of the HMD 10 and the display control device 100 is illustrated as an example, but the number of pairs of the HMD 10 and the display control device 100 is not limited, and any given number of pairs of the HMD 10 and the display control device 100 may be included. In addition, the display control device 100 is an example of a communication device.

The HMD 10 and the display control device 100 are communicably coupled to each other, for example, through a wireless local area network (LAN) such as Wi-Fi Direct (registered trademark). In addition, the display control device 100 and the server 200 are communicably coupled to each other through a network N. Any given type, by wire or wireless, of communication network, such as Internet, a LAN or a virtual private network (VPN) may be employed for such network.

The HMD 10 is worn by the user together with the display control device 100 displays, and displays a display screen transmitted from the display control device 100. A monocular transmissive HMD, for example, may be used as the HMD 10. Note that, various types of HDMs, such as a binocular type or an immersive type, for example, may be used as the HMD 10. In addition, the HMD 10 includes a location detection sensor and an orientation detection sensor for detecting the location of the user and the orientation of the user's face.

The display control device 100 is an information processing device worn and operated by the user, and a mobile communication terminal such as a tablet terminal or a smartphone, for example, may be used as the display control device 100. The display control device 100 receives from the HMD 10, for example, information on the location and the orientation detected by the location detection sensor and the orientation detection sensor of the HMD 10. On detecting object data registered in association with a location which is within an area identified according to the location and the orientation of the HMD 10 detected by the sensors, the display control device 100 displays the object data on the HMD 10. Note that a location detection sensor included in the display control device 100 may be used instead of the location detection sensor of the HMD 10. The display control device 100 calculates distance to the location associated with each of the multiple object data. The display control device 100 performs control to suppress detection of the orientation of the HMD 10, based on distribution of the calculated distances. This thereby enables the display control device 100 to reduce the power consumption of the HMD 10.

The server 200 includes a database, for example, in which an AR content for equipment inspection in a certain factory is managed as object data. The server 200 transmits the object data to the display control device 100 through the network N in response to a request from the display control device 100.

Figure 2:
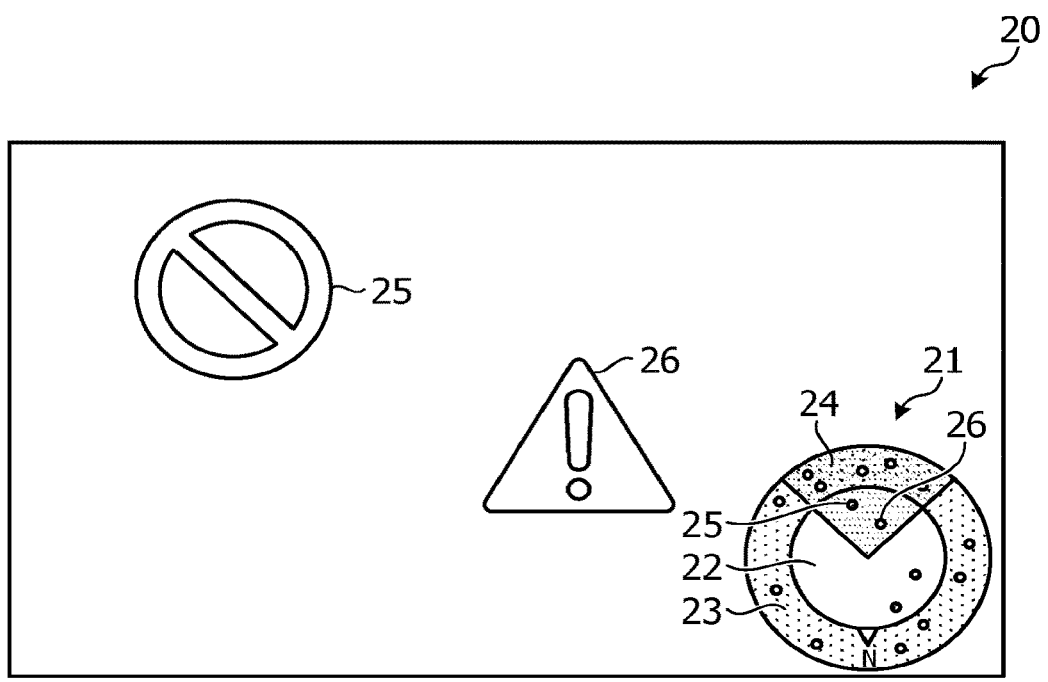
FIG. 2 is a diagram illustrating an example of display of object data.

Description follows regarding an example of a display screen displayed on the HMD 10. FIG. 2 is a diagram illustrating an example of display of object data. As illustrated in FIG. 2, a radar chart 21, and AR contents 25 and 26 that are object data are displayed on a display screen 20. Note that, in the following description, a case in which an AR content is used as an example of object data is explained. On the radar chart 21, the locations of surrounding object data about the user are displayed. In addition, the radar chart 21 includes a display area 22 and a pre-display area 23. The object data in the display area 22 are displayed on the display screen 20. The pre-display area 23 is an area set around the display area 22. The object data are displayed by dots (points) in the radar chart 21.

The object data in the pre-display area 23 are not displayed on the display screen 20 even when the user faces in the direction of the object data, but when the user comes closer to the object data, the object data are displayed on the display screen 20. In addition, the radar chart 21 includes a view 24 indicating the view of the user. Namely, on the display screen 20, object data within the display area 22 and the view 24 in the radar chart 21 are displayed. On the display screen 20 illustrated in FIG. 2, dots corresponding to the AR contents 25 and 26 are present within the view 24, and accordingly the AR contents 25 and 26 are displayed on the display screen 20.

Figure 3:
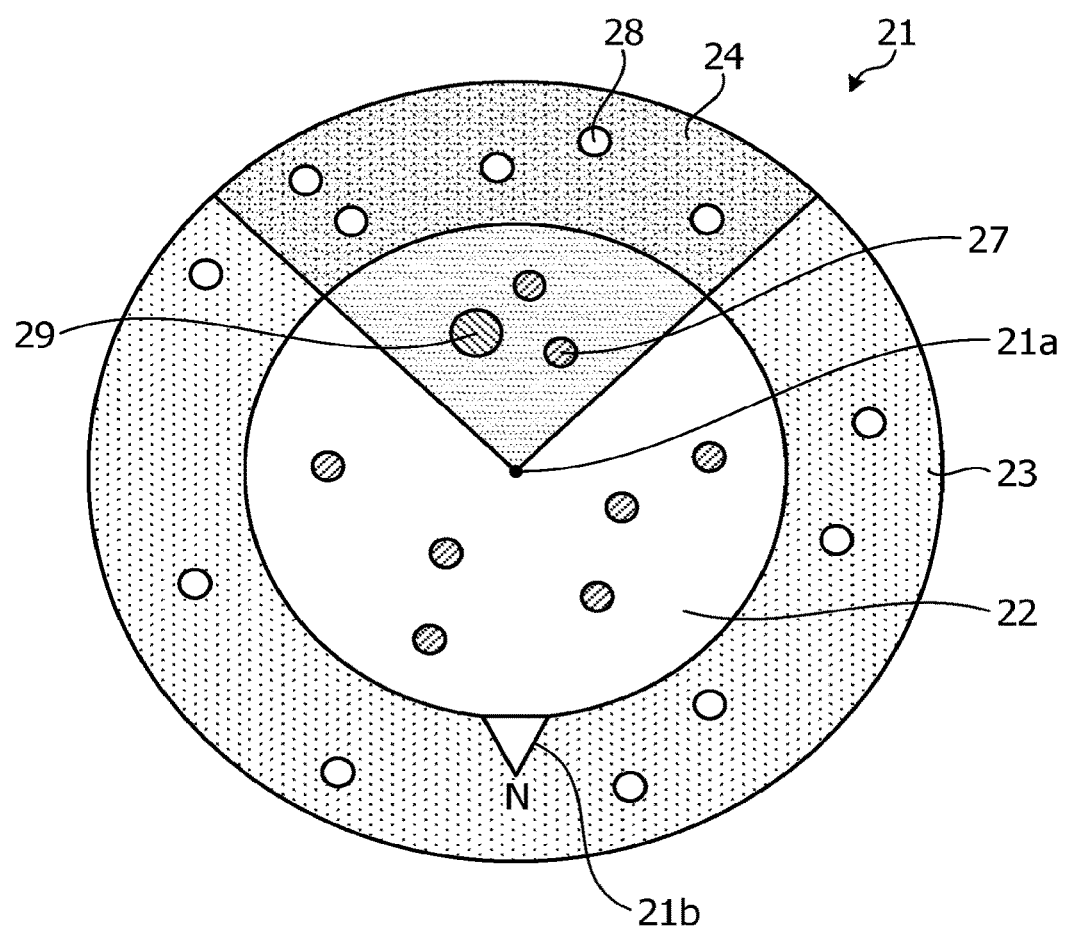
FIG. 3 is a diagram illustrating an example of a radar chart.

FIG. 3 is a diagram illustrating an example of the radar chart. FIG. 3 illustrates the expanded radar chart 21. The radar chart 21 is configured by a circle centered on the user location 21a, and includes the display area 22 that is a circle having the radius of a given distance from the user location 21a and the pre-display area 23 that is an area interposed by the circle of the display area 22 and a circle larger than the circle of the display area 22. In addition, an azimuth mark 21b indicating the North orientation is displayed on the radar chart 21. The azimuth mark 21b may be moved, for example, according to the movement or the orientation of the user.

On the display area 22 and the pre-display area 23, multiple dots, for example, indicating object data are displayed, and for example, object data 27 that is within the display area 22 and also within the view 24, is displayed on the display screen. On the other hand, object data 28 which is within the pre-display area 23 and within the view 24 is not displayed on the display screen. In addition, object data 29 presented by a dot that is larger than the other dots indicates that the object data is being edited in the display control device 100. Note that editing of the object data may include, for example, a change in the location, the size, and addition of information, and the like, of the object data.

Figure 4:
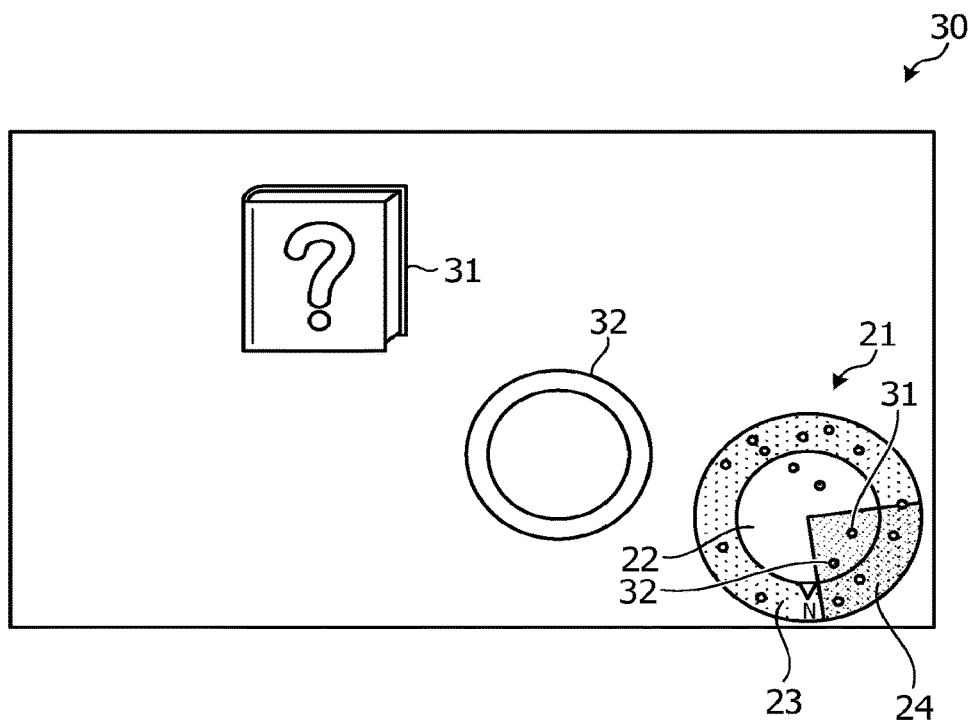
FIG. 4 is a diagram illustrating another example of display of object data.

FIG. 4 is a diagram illustrating another example of display of object data. As illustrated in FIG. 4, a display screen 30 is different from the display screen 20 illustrated in FIG. 2 with respect to the orientation of the user. Namely, the display screen 30 is a display screen in which the user has changed the direction from facing south to facing northwest. In the radar chart 21 of the display screen 30, dots corresponding to AR contents 31 and 32 are present within the display area 22 and also within the view 24. The AR contents 31 and 32 are therefore displayed on the display screen 30. Note that object data in the pre-display area 23 are not displayed.

Figure 5:
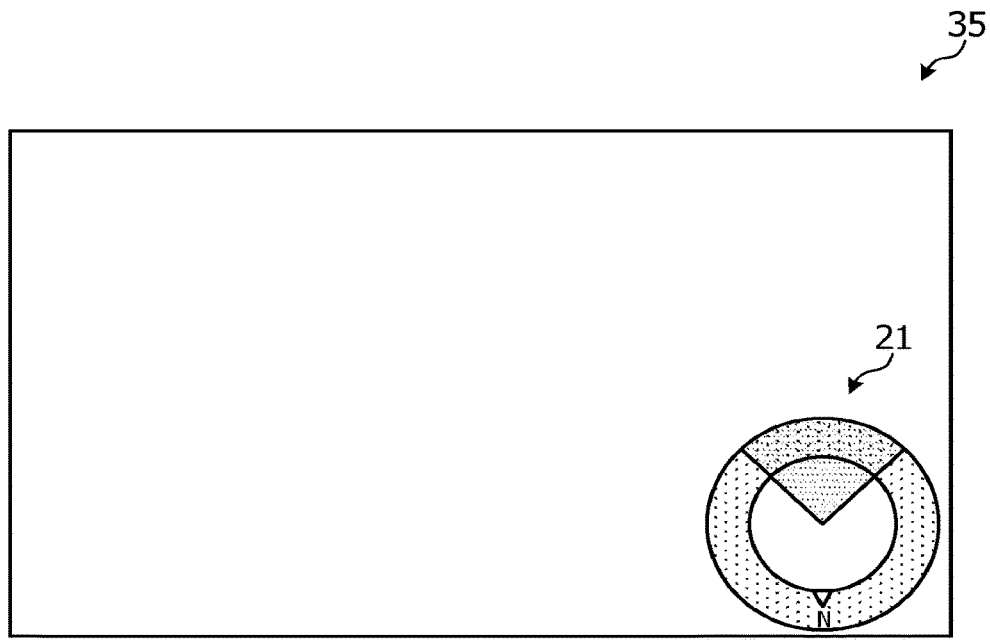
FIG. 5 is a diagram illustrating an example of display when there is no object data to be displayed in a display area.
Figure 6:
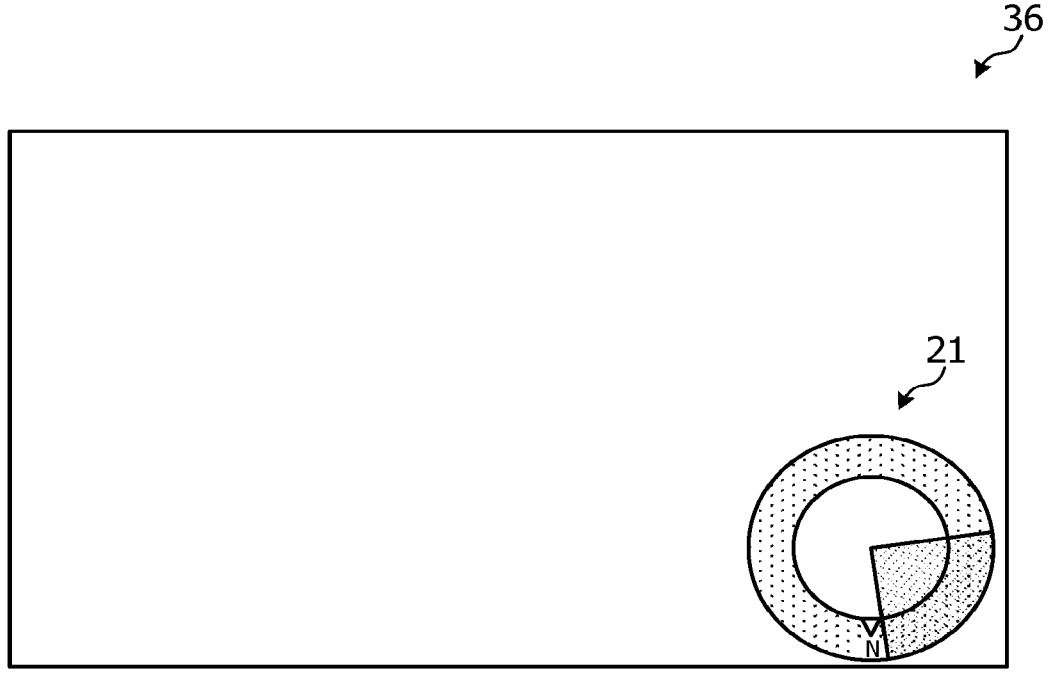
FIG. 6 is a diagram illustrating another example of display when there is no object data to be displayed in the display area.

FIG. 5 is a diagram illustrating an example of display when there is no object data to be displayed in a display area. As illustrated in FIG. 5, a display screen 35 is a display screen when there is no object data in the surrounding area of the user, namely, the display area 22 and the pre-display area 23. In the display screen 35, since there is no object data around the user, no dots indicating object data are displayed either on the radar chart 21. FIG. 6 is a diagram illustrating another example of display when there is no object data to be displayed in the display area. As illustrated in FIG. 6, a display screen 36 is a screen in which the user has changed the direction from the state in the display screen 35, but the display screen 36, including the radar chart 21, still displays no object data despite the change in the direction, since there is no object data around the user. As such, detection of the orientation of the user is rendered useless when there is no object data around the user, permitting the orientation detection sensor to be suspended as a result. In the embodiment, the power consumption of the HMD 10 is reduced paying attention to this point.

Figure 7:
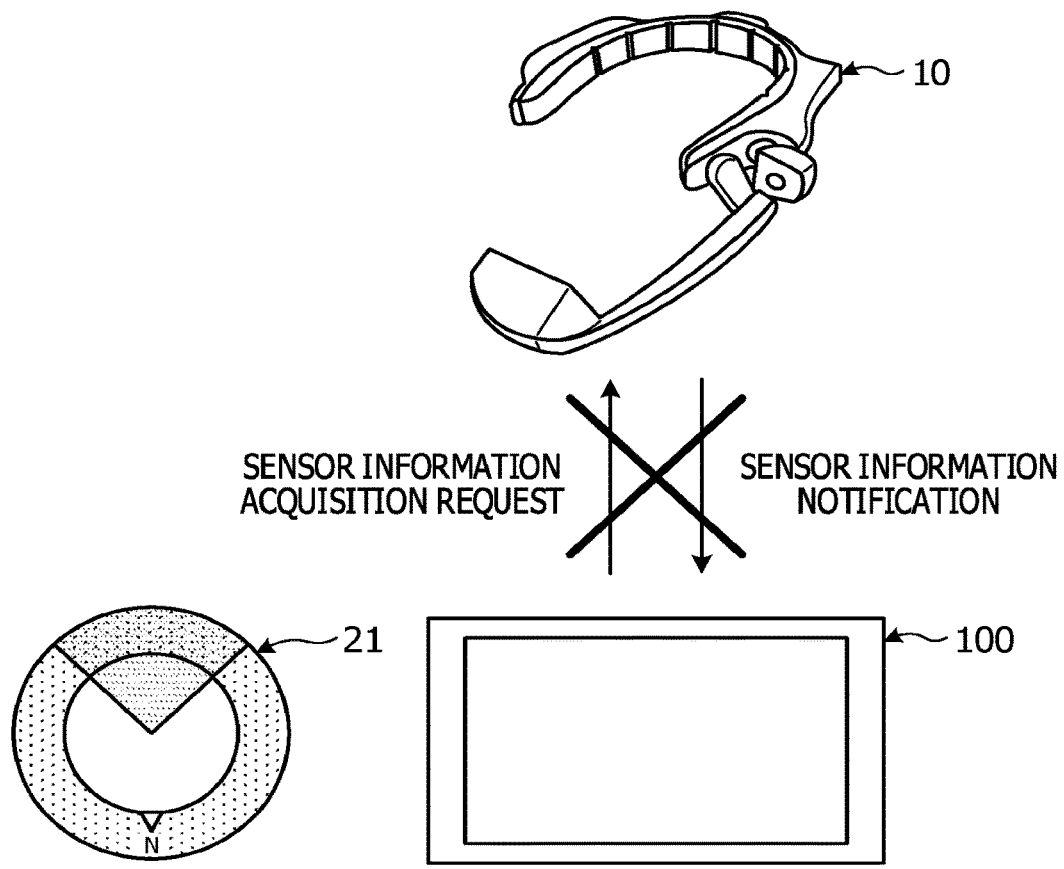
FIG. 7 is a diagram illustrating an example of an operation related to sensor information when there is no object data to be displayed in the display area.

The display control device 100 controls a sensor information acquisition request to the HMD 10 in order to reduce the power consumption of the HMD 10. FIG. 7 is a diagram illustrating an example of an operation related to sensor information when there is no object data to be displayed in the display area. As illustrated in FIG. 7, the display control device 100 suspends a sensor information acquisition request to the HMD 10 when there is no object data in the radar chart 21, because detection of the orientation of the HMD 10 is not called for.

Figure 8:
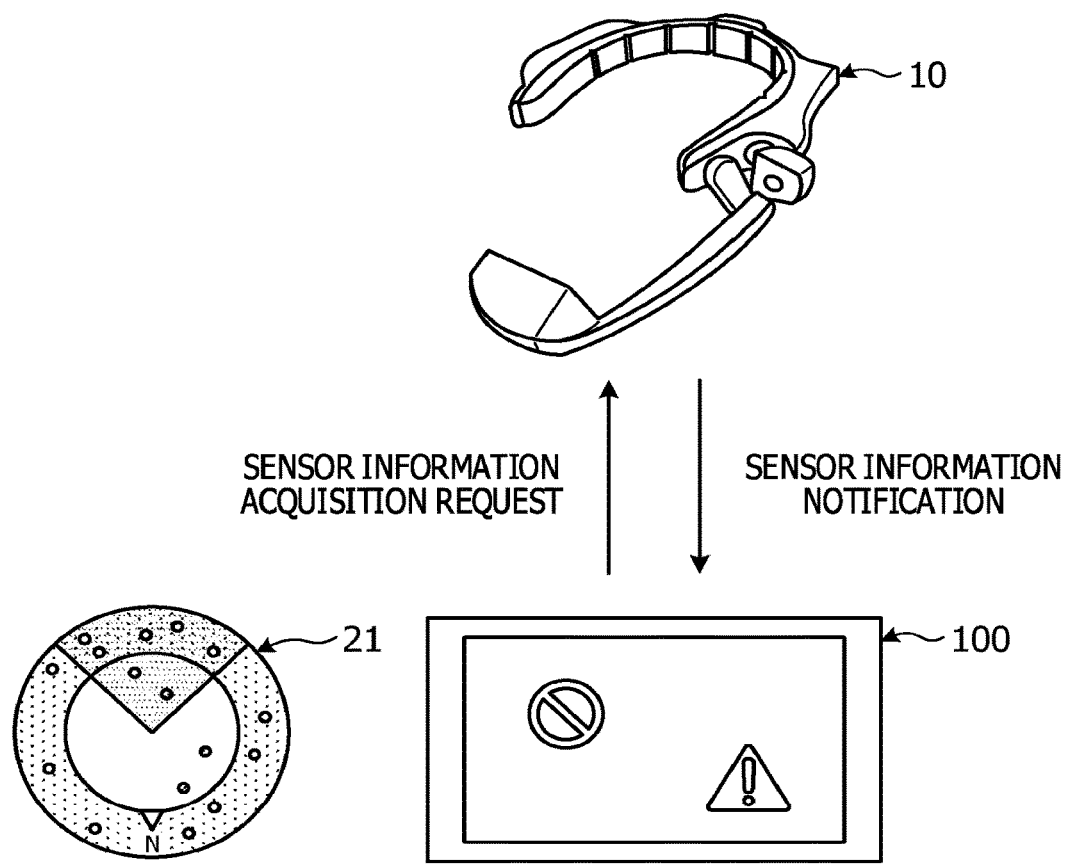
FIG. 8 is a diagram illustrating an example of an operation related to sensor information when there is object data to be displayed in the display area.

FIG. 8 is a diagram illustrating an example of an operation related to sensor information when there is an object data to be displayed in the display area. FIG. 8 illustrates, for example, a case in which the user moves from the location in the state of FIG. 7 to a location at which object data to be displayed are present. As illustrated in FIG. 8, the display control device 100 issues a sensor information acquisition request to the HMD 10 in order to detect the orientation of the HMD 10 when there is object data in the radar chart 21. The display control device 100 controls the sensor information acquisition request to the HMD 10 according to whether object data is present in the radar chart 21 in this manner, thereby enabling the power consumption of the HMD 10 to be reduced.

Description follows regarding the configuration of the HMD 10. As illustrated in FIG. 1, the HMD 10 includes a communication unit 11, a location detection sensor 12, an orientation detection sensor 13, a display unit 14, a storage unit 15, and a control unit 16. Note that the HMD 10 may include, for example, function units such as various input devices, audio output devices, and the like, in addition to the function units illustrated in FIG. 1.

The communication unit 11 is implemented, for example, by a communication module and the like such as a wireless LAN. The communication unit 11 is, for example, a communication interface that is coupled to the display control device 100 wirelessly by Wi-Fi Direct (a registered trademark), and that is responsible for communication of information with the display control device 100. The communication unit 11 receives sensor control information and a display screen from the display control device 100. The communication unit 11 outputs the received sensor control information and display screen to the control unit 16. On the other hand, the communication unit 11 transmits sensor information input from the control unit 16, to the display control device 100.

The location detection sensor 12 is a sensor that detects the location of the HMD 10, namely, the location of the user. The location detection sensor 12 is, for example, a global positioning system (GPS) receiver, and generates location information including the longitude, the latitude, and the altitude based on a received GPS signal. The location detection sensor 12 outputs the generated location information to the control unit 16. In addition, control information is input from the control unit 16 to the location detection sensor 12, for starting or ending the operation, change a measurement cycle, and the like. The location detection sensor 12 starts and ends the operation, and changes the measurement cycle, and the like, based on the input control information. Note that the location detection sensor 12 may be a sensor compatible with another positioning system. In addition, when the location of the user is measured by the display control device 100, the location detection sensor 12 may suspend the operation, or may not be provided.

The orientation detection sensor 13 is a sensor that detects the orientation of the HMD 10, namely, the orientation of the user. The orientation detection sensor 13 detects the orientation of the user, namely, the direction in which the user faces, for example, using an acceleration sensor, a gyro sensor, and an orientation sensor. A piezoresistive type or a capacitance type three axis acceleration sensor may be used, for example, as the acceleration sensor. A vibration type gyro sensor may be used, for example, as the gyro sensor. A magnetic sensor may be used for example, as the orientation sensor. The orientation detection sensor 13 outputs orientation information including the detected orientation to the control unit 16. In addition, control information for starting and ending the operation, or changing the measurement cycle, and the like, is input from the control unit 16 to the orientation detection sensor 13. The orientation detection sensor 13 starts and ends the operation, and changes the measurement cycle, and the like, based on the input control information.

The display unit 14 is a display device for displaying various information. The display unit 14 corresponds to, for example, a display element of a transmissive HMD in which an image is projected on the half mirror, and the user may see through the outside scenery together with the image. Note that the display unit 14 may be a display element compatible with an immersive type, a video transmission type, a retinal projection type, or the like of HMD.

The storage unit 15 is implemented, for example, by a storage device of a semiconductor memory element or the like such as a random access memory (RAM) or a flash memory. The storage unit 15 stores information used for the processing in the control unit 16.

The control unit 16 is implemented, for example, by a program stored in internal storage device being executed by a central processing unit (CPU), a micro processing unit (MPU), or the like using the RAM as a work area. In addition, the control unit 16 may be implemented, for example, by an integrated circuit such as an application specific integrated circuit (ASIC) or a field programmable gate array (FPGA). The control unit 16 includes a sensor control unit 17 and a display control unit 18, and implements or executes functions and operations of information processing described below. Note that the internal configuration of the control unit 16 is not limited to the configuration illustrated in FIG. 1, and may have another configuration as long as the configuration executes the information processing described later.

The sensor control unit 17 controls the location detection sensor 12 and the orientation detection sensor 13 based on the sensor control information received from the display control device 100 through the communication unit 11. For example, when the power to the HMD 10 is applied, the sensor control unit 17 starts transmission and reception service of sensor information. The transmission and reception service executes an operation corresponding to an application programming interface (API) included in the sensor control information received from the display control device 100, based on the API defined in advance. Operations executed by the transmission and reception service include, for example, controlling sensor operation and changing measurement cycle.

Examples of the APIs include "getSensorInfo (Boolean isGetSensorInfo)" for controlling the start and the end of the sensor operation. For this API, "getSensorInfo" is the API name and "(Boolean isGetSensorInfo)" is an API argument. Of the API argument, "Boolean" indicates the type of argument and assumes a binary value ("true" or "false"). "isGetSensorInfo" of the API argument is an actual parameter of the API. When using this API from the display control device 100, for example, setting the API argument "isGetSensorInfo" to "true" starts acquisition of sensor information in the HMD 10, and transmission of the sensor information to the display control device 100 is started. On the other hand, setting the API argument "isGetSensorInfo" to "false", ends acquisition of the sensor information in the HMD 10, and the transmission of the sensor information to the display control device 100 is ended. Put another way, the sensor control information that includes the API with the API argument "isGetSensorInfo" set to "true" is a request to acquire sensor information. Conversely, the sensor control information that includes the API with the API argument "isGetSensorInfo" set to "false" cancels the request to acquire sensor information.

The sensor control unit 17 outputs control information instructing start of output of one or more out of the location information and the orientation information based on the sensor control information corresponding to an acquisition request of sensor information, to one or more out of the corresponding location detection sensor 12 and corresponding orientation detection sensor 13. One or more out of the location information and the orientation information starts to be input from one out of the location detection sensor 12 and the orientation detection sensor 13, to the sensor control unit 17. The sensor control unit 17 sets one or more out of the location information and the orientation information, which the sensor control unit 17 has started to receive, as the sensor information, and starts transmitting such sensor information to the display control device 100 through the communication unit 11. Note that the sensor control unit 17 transmits the sensor information that includes one or more out of the location information and the orientation information, for example, at intervals of one second.

The sensor control unit 17 outputs control information that instructs termination of output of the information to one or more out of the corresponding location detection sensor 12 and orientation detection sensor 13, based on sensor control information corresponding to a request to cancel acquisition of the sensor information. Note that, the sensor control unit 17 controls corresponding one or more out of the location detection sensor 12 and orientation detection sensor 13, for example, similarly for sensor control information corresponding to a request or the like to extend an acquisition interval of the sensor information.

Description follows regarding the orientation information. The orientation information is information indicating the respective rotation angles of the x axis, the y axis, and the z axis of the HMD 10. The x axis, the y axis, and the z axis respectively correspond to the longitude, the altitude, and the latitude in the world coordinate system. The rotation angle of the x axis is represented by "Pitch", and is a rotation angle centered on the x axis. The data acquisition range of "Pitch" is "$-\pi/2 <= \text{Pitch} <= \pi/2$" [rad]. The rotation angle of the y axis is represented by "Azimuth", and is a rotation angle centered on the y axis. The data acquisition range of "Azimuth" is "$-2\pi <= \text{Azimuth} <= 2\pi$" [rad]. The rotation angle of the z axis is represented by "Roll", and is a rotation angle centered on the z axis. The data acquisition range of "Roll" is "$-2\pi <= \text{Roll} <= 2\pi$" [rad].

The display control unit 18 displays through the display unit 14 the display screen received from the display control device 100 via the communication unit 11. In addition, the display control unit 18 updates the display of the display unit 14 according to an update of the display screen.

Description follows regarding the configuration of the display control device 100. As illustrated in FIG. 1, the display control device 100 includes a first communication unit 110, a second communication unit 111, a display operation unit 112, a location detection sensor 113, a storage unit 120, and a control unit 130. Note that the display control device 100 may include various function units included in a known computer, for example, various function units such as an input device, an audio output device, and the like, in addition to the function units illustrated in FIG. 1.

The first communication unit 110 is implemented, for example, by a communication module or the like such as a wireless LAN. The first communication unit 110 is, for example, a communication interface that is coupled to the HMD wirelessly by Wi-Fi Direct (a registered trademark), and that is responsible for communication of information with the HMD 10. The first communication unit 110 receives sensor information from the HMD 10. The first communication unit 110 outputs the received sensor information to the control unit 130. In addition, the first communication unit 110 transmits sensor control information and display screen input from the control unit 130, to the HMD 10.

The second communication unit 111 is implemented, for example, by a mobile phone line such as a third generation mobile communication system, a long term evolution (LTE) system and the like, and a communication module or the like such as a wireless LAN. The second communication unit 111 is a communication interface coupled to the server 200 through the network N wirelessly and is responsible for communication of information with the server 200. The second communication unit 111 transmits a data acquisition instruction input from the control unit 130 to the server 200 through the network N. In addition, the second communication unit 111 receives object data according to the data acquisition instruction from the server 200 through the network N. The second communication unit 111 outputs the received object data to the control unit 130.

The display operation unit 112 is a display device for displaying various information and an input device for accepting various operations from the user. For example, the display operation unit 112 is implemented by a liquid crystal display or the like as the display device. In addition, for example, the display operation unit 112 is implemented by a touch panel or the like as the input device. Namely, the display device and the input device are integrated in the display operation unit 112. The display operation unit 112 outputs an operation input by the user to the control unit 130 as operation information. Note that the display operation unit 112 may display a screen similar to that of the HMD 10 or a screen different from that of the HMD 10.

The location detection sensor 113 is a sensor that detects the location of the display control device 100, namely, the location of the user. The location detection sensor 113 is, for example, a GPS receiver, and generates location information including the longitude, the latitude, and the altitude based on a received GPS signal. The location detection sensor 113 outputs the generated location information to the control unit 130. Note that the location detection sensor 113 may be a sensor compatible with another positioning system. In addition, when the location of the user is measured by the HMD 10, the location detection sensor 113 may suspend the operation.

The storage unit 120 is implemented, for example, by a RAM, a semiconductor memory element such as a flash memory, or a storage device such as a hard disk or an optical disk. The storage unit 120 includes an object data storage unit 121. In addition, the storage unit 120 stores information used for the processing in the control unit 130.

The object data storage unit 121 stores object data acquired from the server 200. FIG. 9 is a diagram illustrating an example of the object data storage unit. As illustrated in FIG. 9, the object data storage unit 121 includes items of "object identifier (ID)", "object data", and "location information". The object data storage unit 121 stores, for example, each piece of the object data as one record.

Here, "object ID" is an identifier by which object data, namely, an AR content is identified. "Object data" is information indicating the object data acquired from the server 200. "Object data" is, for example, a data file that constitutes the object data, namely, the AR content. "Location information" is location information associated with the object data. "Location information" is information indicating the location information in the world coordinate system of the associated object data.

The control unit 130 is implemented, for example, by a program stored in an internal storage device being executed by the CPU, the MPU, or the like, using the RAM as a work area. In addition, the control unit 130 may be implemented, for example, by an integrated circuit such as the ASIC or the FPGA. The control unit 130 includes a display control unit 131, a calculation unit 132, a detection control unit 133, and a location measurement unit 134, and implements or executes functions and operations of information processing described below. Note that the internal configuration of the control unit 130 is not limited to the configuration illustrated in FIG. 1, and another configuration may be employed as long as the configuration executes the information processing described later.

The display control unit 131 starts an application using AR middleware. When the application is started, the display control unit 131 starts to transmit a display screen of the application to the HMD 10 through the first communication unit 110.

When the application is started, the display control unit 131 transmits a data acquisition instruction to the server 200 through the second communication unit 111 and the network N. When the display control unit 131 receives object data corresponding to the data acquisition instruction from the server 200 through the second communication unit 111 and the network N, the display control unit 131 stores the received object data in the object data storage unit 121.

When the application is started, the display control unit 131 generates and starts a transmission and reception service of sensor information. Similarly to the transmission and reception service of the HMD 10, the transmission and reception service of the display control device 100 operates based on an API defined in advance. The API provides the transmission and reception service of sensor information when the API is called from another function unit.

When the application is started, the display control unit 131 outputs a positioning start instruction to the location measurement unit 134. Note that, when the location detection sensor 12 of the HMD 10 is used, the display control unit 131 transmits sensor control information corresponding to an acquisition request of sensor information including the positioning start instruction to the HMD 10 through the first communication unit 110.

When the display area 22 and the pre-display area 23 are input from the calculation unit 132, the display control unit 131 displays the radar chart 21 on the display screen. In addition, when the locations of object data within the display area 22 and the pre-display area 23 are input from the detection control unit 133, the display control unit 131 displays the input locations of the object data on the display area 22 and the pre-display area 23.

When the view 24 is input from the calculation unit 132, the display control unit 131 displays the input view 24 superimposed on the display area 22 and the pre-display area 23. In addition, the display control unit 131 displays object data which is within the display area 22 and within the view 24 on the display screen, with reference to the object data storage unit 121. Put another way, the display control unit 131 transmits to the HMD 10 an image including a given object according to the search for an object based on the location and the orientation received from the HMD 10.

Location information corresponding to a start of positioning in the location measurement unit 134, or location information included in the sensor information received through the first communication unit 110 corresponding to a start of positioning in the HMD 10, is input to the calculation unit 132. When the location information is input, the calculation unit 132 sets the display area 22 and the pre-display area 23, based on the location information of the user and distances corresponding to the display area 22 and the pre-display area 23, which have been set in advance. Namely, the calculation unit 132 calculates distance between the user and the object data, based on the input location information. Put another way, the calculation unit 132 calculates distances from the user to the locations respectively associated with the multiple object data. The calculation unit 132 outputs the set display area 22 and pre-display area 23 to the display control unit 131 and the detection control unit 133.

In addition, orientation information included in the sensor information received through the first communication unit 110 is input to the calculation unit 132. The calculation unit 132 sets the view 24 of the user, based on the display area 22, the pre-display area 23, and the orientation information. The calculation unit 132 outputs the set view 24 to the display control unit 131.

When the set display area 22 and the set pre-display area 23 are input from the calculation unit 132, the detection control unit 133 detects object data located in the display area 22 and the pre-display area 23, with reference to the object data storage unit 121. Namely, the detection control unit 133 determines whether or not object data is present in the display area 22 and the pre-display area 23. Namely, the detection control unit 133 determines whether or not all of the calculated distances between the user and the object data are within the display area 22 or the pre-display area 23.

When one or more out of the calculated distances between the user and the object data are within the display area 22 or the pre-display area 23, the detection control unit 133 transmits an acquisition request of sensor information, corresponding to the orientation information, to the HMD 10 through the first communication unit 110. In addition, the detection control unit 133 outputs the locations of the object data, within the display area 22 and the pre-display area 23, to the display control unit 131. Note that, when the location information is acquired in the HMD 10, the detection control unit 133 transmits a request to acquire sensor information corresponding to the location information. Namely, the detection control unit 133 transmits a request that the HMD 10 acquires the sensor information corresponding to the location information to be measured at a normal measurement interval.

When none of the calculated distances between the user and the object data are within the display area 22 or the pre-display area 23, the detection control unit 133 transmits a request to cancel acquisition of the sensor information, corresponding to the orientation information, to the HMD 10 through the first communication unit 110. Note that the detection control unit 133 continuously outputs the locations of object data in the display area 22 and the pre-display area 23 to the display control unit 131. In this case, when no object data is located in the display area 22 and the pre-display area 23, namely, when the detection control unit 133 transmits a request to cancel acquisition of the sensor information corresponding to the orientation information to the HMD 10, the detection control unit 133 suspends output of the location of the object data. Note that, when acquiring the location information in the HMD 10, the detection control unit 133 transmits a request to cancel acquisition of sensor information corresponding to the location information. Namely, the detection control unit 133 transmits to the HMD 10 a request to cancel acquisition of the sensor information corresponding to the location information, such that the measurement interval is lengthened than a normal time, namely, location is measured in a longer measurement cycle.

Put another way, the detection control unit 133 detects object data registered associated with a location in the area identified according to the location and the orientation of the HMD 10 detected by the sensors. In addition, the detection control unit 133 performs control in which the detection of the orientation of the HMD 10 is suppressed based on a distribution of calculated distances. In addition, when none out of the multiple locations associated with the object data is included in the target area for displaying object data on the HMD 10, the detection control unit 133 performs control to suppress detection of the orientation of the HMD 10. In addition, when all of the multiple locations associated with the object data has a distance longer than a specified distance, the detection control unit 133 performs control to suppress detection of the orientation of the HMD 10.

In addition, the detection control unit 133 transmits to the HMD 10, a signal for controlling operation of the sensor included in the HMD 10 or transmission of sensor information, according to a determination result as to whether there is an object associated with a position having a given positional relationship with the location measured by the location measurement unit 134. In addition, when the determination result indicates an absence of the object, the detection control unit 133 transmits to the HMD 10 a sensor control information for making the cycle longer, compared with the case in which the determination result indicates a presence of the object. The sensor control information for making the cycle longer is a signal for performing one or more out of a control for making the sensor's detection operation cycle longer and a control for making the cycle of transmission of sensor information longer.

In addition, the detection control unit 133 determines whether or not there is an object associated with a location having a given positional relationship with the location based on the location of receipt from the HMD 10. The detection control unit 133 transmits to the HMD 10, a signal for controlling operation of the location detection sensor 12 and/or the orientation detection sensor 13, or transmission of sensor information acquired by the location detection sensor 12 and/or the orientation detection sensor 13, according to the determination result of the presence of the object.

In addition, the detection control unit 133 transmits a signal instructing the HMD 10 to transmit the orientation detected by the orientation detection sensor 13, according to the search for an object associated with a location having a given positional relationship with a location based on the location of receipt.

When a positioning start instruction is input from the display control unit 131, the location measurement unit 134 instructs the location detection sensor 113 to start the positioning. When location information is input from the location detection sensor 113, the location measurement unit 134 outputs the input location information to the calculation unit 132. In addition, in a case in which the application has ended, the location measurement unit 134 instructs the location detection sensor 113 to end the positioning.

Figure 10:
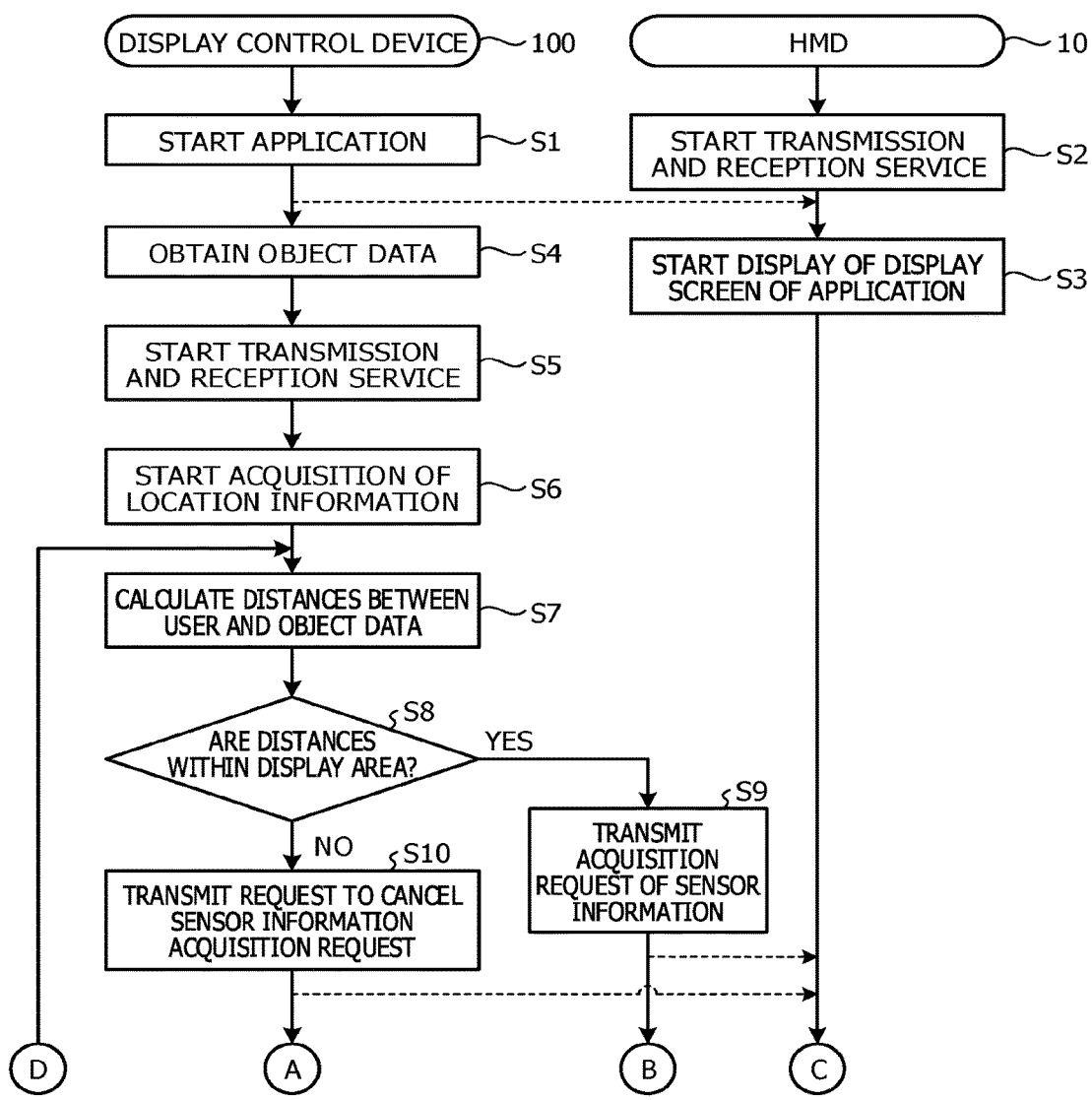
FIG. 10 is a sequence diagram illustrating an example of display control processing in the embodiment.
Figure 11:
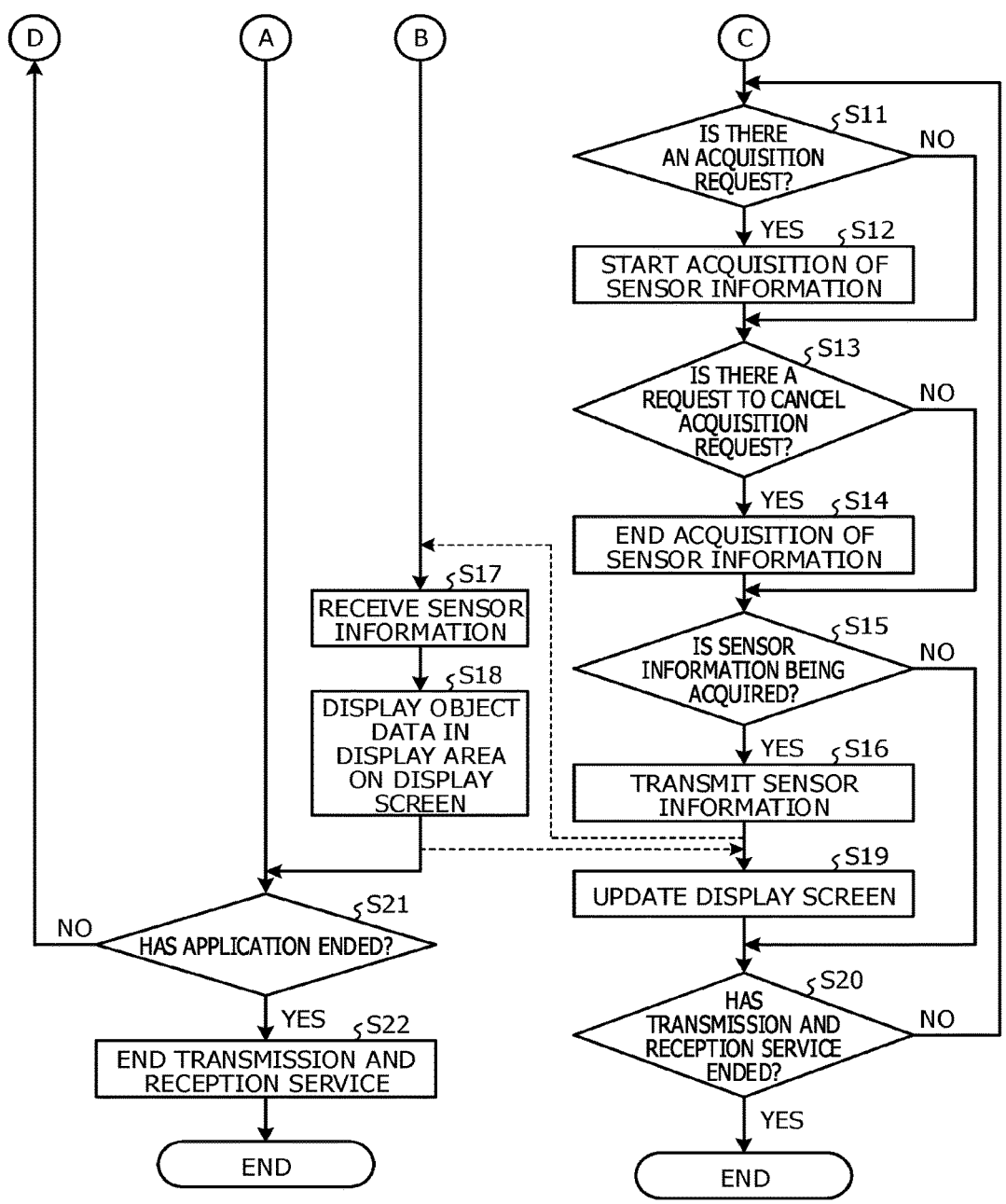
FIG. 11 is the sequence diagram illustrating the example of the display control processing in the embodiment.

Description follows regarding the operation of the display control system 1 in the embodiment. FIGS. 10 and 11 are sequence diagrams illustrating an example of the display control processing in the embodiment.

The display control unit 131 of the display control device 100 starts the application that uses the AR middleware (Step S1). When the application is started, the display control unit 131 starts to transmit the display screen of the application to the HMD 10.

When the power to the HMD 10 is applied, the sensor control unit 17 of the HMD 10 starts a transmission and reception service of sensor information (Step S2). The display control unit 18 starts to display the display screen of the application received from the display control device 100 (Step S3).

When the application is started, the display control unit 131 transmits a data acquisition instruction to the server 200. When object data corresponding to the data acquisition instruction is received from the server 200, the display control unit 131 stores the received and acquired object data in the object data storage unit 121 (Step S4).

In addition, when the application is started, the display control unit 131 generates and starts a transmission and reception service of sensor information (Step S5). In addition, the display control unit 131 outputs a positioning start instruction to the location measurement unit 134. When the positioning start instruction is input from the display control unit 131, the location measurement unit 134 instructs the location detection sensor 113 to start the positioning. When the location information is input from the location detection sensor 113, the location measurement unit 134 outputs the input location information to the calculation unit 132 (Step S6).

The location information corresponding to the start of positioning in the location measurement unit 134 is input to the calculation unit 132. When the location information is input, the calculation unit 132 calculates distances between the user and object data based on the input location information (Step S7). Namely, the calculation unit 132 sets the display area 22 and the pre-display area 23. The calculation unit 132 outputs the set display area 22 and the set pre-display area 23 to the display control unit 131 and the detection control unit 133. When the display area 22 and the pre-display area 23 are input from the calculation unit 132, the display control unit 131 displays the radar chart 21 on the display screen.

When the set display area 22 and the set pre-display area 23 are input from the calculation unit 132, the detection control unit 133 determines whether all of the distances between the user and the object data are within the display area 22 or the pre-display area 23 (Step S8). When one or more out of the distances between the user and the object data are within the display area 22 or the pre-display area 23 (Step S8: Yes), the detection control unit 133 transmits an acquisition request of sensor information corresponding to the orientation information, to the HMD 10 (Step S9). In addition, the detection control unit 133 outputs the locations of the object data in the display area 22 and the pre-display area 23 to the display control unit 131. In addition, when the locations of the object data in the display area 22 and the pre-display area 23 are input from the detection control unit 133, the display control unit 131 displays the locations of the object data, which have been input, on the display area 22 and the pre-display area 23.

When none of the distances between the user and the object data are within the display area 22 or the pre-display area 23 (Step S8: No), the detection control unit 133 transmits to the HMD 10 a request to cancel acquisition of sensor information corresponding to the orientation information (Step S10).

On receiving an acquisition request or a request to cancel acquisition of sensor information corresponding to the orientation information, the sensor control unit 17 of the HMD 10 determines whether or not there is an acquisition request (Step S11). When there is an acquisition request (Step S11: Yes), the sensor control unit 17 outputs control information instructing the orientation detection sensor 13 to start output of the orientation information. Namely, the sensor control unit 17 starts acquisition of sensor information (Step S12). When there is no acquisition request (Step S11: No), the sensor control unit 17 proceeds to Step S13.

The sensor control unit 17 determines whether or not there is a request to cancel acquisition (Step S13). When there is a request to cancel acquisition (Step S13: Yes), the sensor control unit 17 outputs control information instructing the orientation detection sensor 13 to end the output of the orientation information. Namely, the sensor control unit 17 ends acquisition of the sensor information (Step S14). When there is no request to cancel acquisition (Step S13: No), the sensor control unit 17 proceeds to Step S15.

The sensor control unit 17 determines whether the sensor information is being acquired (Step S15). When the sensor information is being acquired (Step S15: Yes), the sensor control unit 17 sets the orientation information being acquired from the orientation detection sensor 13 as the sensor information, and transmits the sensor information to the display control device 100 (Step S16). When the sensor information is not being acquired (Step S15: No), the sensor control unit 17 proceeds to Step S20.

On receiving the sensor information including the orientation information (Step S17), the calculation unit 132 of the display control device 100 sets the view 24 of the user, based on the display area 22, the pre-display area 23, and the orientation information. The calculation unit 132 outputs the set view 24 to the display control unit 131.

When the view 24 is input from the calculation unit 132, the display control unit 131 displays the input view 24 superimposed on the display area 22 and the pre-display area 23. In addition, the display control unit 131 displays object data which is within the display area 22 and within the view 24 on the display screen, with reference to the object data storage unit 121 (Step S18). Namely, the display control unit 131 updates the display screen.

The display control unit 18 of the HMD 10 updates the display of the display unit 14 according to the update of the display screen (Step S19). The sensor control unit 17 determines whether or not the transmission and reception service has ended (Step S20). In a case in which the transmission and reception service has not ended (Step S20: No), the sensor control unit 17 returns to Step S11. When the transmission and reception service is ended (Step S20: Yes), the sensor control unit 17 ends the processing.

The display control unit 131 of the display control device 100 determines whether or not the application has ended (Step S21). In a case in which the application has not ended (Step S21: No), the display control unit 131 returns to Step S7. In a case in which the application has ended (Step S21: Yes), the display control unit 131 ends the transmission and reception service (Step S22), and ends the display control processing. This thereby enables the display control device 100 to reduce the power consumption of the HMD 10.

Note that, although in the above-described example the display control device 100 measures the location of the user, the embodiment is not limited thereto. For example, the HMD 10 may measure the location of the user.

In this manner, the display control device 100 detects object data registered associated with a location in the area identified according to the location and the orientation of the HMD 10 detected by the sensors. In addition, the display control device 100 displays the detected object data on the HMD 10. In addition, the display control device 100 calculates distances to the locations associated with each of the multiple object data. In addition, the display control device 100 performs control to suppress detection of the orientation of the HMD 10 based on a distribution of the calculated distances. This thereby enables the power consumption of the HMD 10 to be reduced.

In addition, when none out of the multiple locations associated with the object data is included in the target area for displaying object data on the HMD 10, the display control device 100 performs control to suppress detection of the orientation of the HMD 10. This thereby enables the power consumption of the HMD 10 to be reduced when there is no object data to be displayed.

In addition, when all of any of the multiple locations associated with the object data has a distance longer than a specified distance, the display control device 100 performs control to suppress detection of the orientation of the HMD 10. This thereby enables the power consumption of the HMD 10 to be reduced when the object data are located farther away than the specified distance from the user.

In addition, the display control device 100 receives sensor information from the HMD 10. In addition, the display control device 100 measures the location. In addition, the display control device 100 transmits to the HMD 10, a signal for controlling operation of the sensor included in the HMD 10 or transmission of sensor information, according to a determination result as to whether there is an object associated with a position having a given positional relationship with the measured location. As a result, the operation of the sensor of the HMD 10 or the transmission of the sensor information may be controlled according to whether or not there is an object.

In addition, the sensor included in the HMD 10 is a sensor that detects the orientation of the HMD 10. As a result, the detection of the orientation of the HMD 10 may be controlled according to whether or not there is an object.

In addition, when the determination result indicates an absence of the object, the display control device 100 transmits to the HMD 10, a signal for performing one or more out of a control for making the sensor's detection operation cycle longer and a control for making the cycle of transmission of sensor information longer, compared with the case in which the determination result indicates a presence of the object. This thereby enables the power consumption of the HMD 10 to be reduced.

In addition, the display control device 100 receives the location detected in the location detection sensor 12, from the HMD 10 that includes the location detection sensor 12 and the orientation detection sensor 13. In addition, the display control device 100 transmits, to the HMD 10, a signal for controlling the location detection sensor 12 and/or the orientation detection sensor 13 according to a determination result as to whether or not there is an object associated with a location having a given positional relationship with the location based on the location of receipt. The signal for controlling is a signal for controlling the operation of the location detection sensor 12 and/or the orientation detection sensor 13, or transmission of the sensor information acquired by the location detection sensor 12 and/or the orientation detection sensor 13.

In addition, the display control device 100 receives the location detected by the location detection sensor 12, from the HMD 10 that includes the location detection sensor 12 and the orientation detection sensor 13. In addition, the display control device 100 transmits the signal to the HMD 10. In addition, the display control device 100 performs control such that a signal is transmitted instructing the HMD 10 to transmit the orientation detected by the orientation detection sensor 13, according to the search for an object associated with a location having a given positional relationship with a location based on the location of receipt. In addition, the display control device 100 performs control such that an image including a given object is transmitted to the HMD 10, according to the search for an object based on the location and the orientation received from the HMD 10. This thereby enables the object corresponding to the location and orientation of the HMD 10 to be displayed.

Note that, although in the above-described example the detection of the orientation by the orientation detection sensor 13 is suppressed when there is no object data in the display area 22 nor in the pre-display area 23, the embodiment is not limited thereto. For example, the detection of the orientation by the orientation detection sensor 13 may be suppressed when there is no object data in the display area 22.

In addition, in the above-described example, the equipment inspection in the factory is described above as an example, but the embodiment is not limited thereto. For example, the embodiment may be applied to a tourist guidance or the like at a sightseeing spot.

In addition, in the above-described example, the example is described above in which the user wears the display control device 100 and the HMD 10, but the embodiment is not limited thereto. For example, without using the HMD 10, the screen may be displayed for example, on the display operation unit 112 of the display control device 100 which is a smartphone.

In addition, the configuration element of each of the illustrated units does not have to be physically configured as illustrated in the diagrams. Namely, a specific form of distribution or integration of the units is not limited to those illustrated in the drawings, and all or some of the units may be configured so as to be distributed or integrated functionally or physically in any given unit according to various loads, usage conditions, and the like. For example, the calculation unit 132 and the detection control unit 133 may be integrated. In addition, the embodiment is not limited to the above-described order of the processing, and each of the processing steps may be executed simultaneously or changing the order to the extent no inconsistency arises in the processing.

In addition, all or some of the various processing functions executed in each of the devices may be executed on a CPU (or a microcomputer such as a MPU or a micro controller unit (MCU)). In addition, all or some of the various processing functions may be obviously executed on a program analyzed and executed by the CPU (or the microcomputer such as the MPU or the MCU) or hardware by wired logic.

Figure 12:
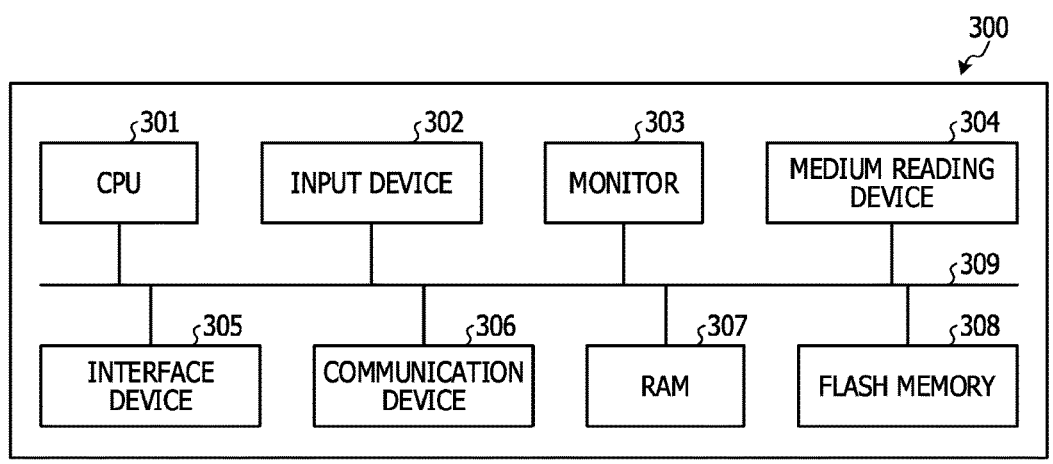
FIG. 12 is a diagram illustrating an example of a computer that executes a display control program.

Various kinds of processing described in the above embodiments may be implemented by a program prepared in advance being executed by a computer. Therefore, in the following description, an example of a computer that executes a program having functions similar to those of the above-described embodiment is described. FIG. 12 is a diagram illustrating an example of a computer that executes a display control program.

As illustrated in FIG. 12, a computer 300 includes a CPU 301 that executes various kinds of calculation processing, an input device 302 that accepts data input, and a monitor 303. In addition, the computer 300 includes a medium reading device 304 that reads a program and the like from a storage medium, an interface device 305 for connecting with various devices, and a communication device 306 for connecting with another information processing device or the like by a wire or wirelessly. In addition, the computer 300 includes a RAM 307 that temporarily stores various information and a flash memory 308. In addition, each of the devices 301 to 308 is coupled to a bus 309.

In the flash memory 308, a display control program is stored that includes functions similar to those of the display control unit 131, the calculation unit 132, the detection control unit 133, and the location measurement unit 134 illustrated in FIG. 1. In addition, in the flash memory 308, various data for implementing the object data storage unit 121 and the display control program are stored. The input device 302 accepts, for example, inputs of various pieces of information such as operation information from the user of the computer 300. The monitor 303 displays, for example, various screens such as a display screen for the user of the computer 300. The interface device 305 is, for example, coupled to a headphone and the like. The communication device 306 includes, for example, functions similar to those of the first communication unit 110 and the second communication unit 111 illustrated in FIG. 1, and coupled to the HMD 10 and the network N, and transmits and receives various information to and from the HMD 10 and the server 200.

The CPU 301 executes various kinds of processing by reading each of the programs stored in the flash memory 308, deploying the programs to the RAM 307, and executing the programs. In addition, the programs allow the computer 300 to function as the display control unit 131, the calculation unit 132, the detection control unit 133, and the location measurement unit 134 illustrated in FIG. 1.

The above-described display control program does not have to be stored in the flash memory 308. For example, a program stored in a storage medium readable by the computer 300 may be executed by the computer 300 reading the program. The storage medium readable by the computer 300 corresponds to, for example, a portable recording medium such as a compact disc-read-only memory (CD-ROM), a digital versatile disk (DVD), a universal serial bus (USB) memory, a semiconductor memory such as a flash memory, and a hard disk drive. In addition, a device coupled to a public lines, the Internet, a LAN, or the like may store such a display control program, and the computer 300 may read the display control program from the device and execute the display control program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   a first sensor configured to measure a location of a first device;
   a second sensor configured to measure an orientation of a second device;
   a display; and
   a processor configured to:
      control the first sensor to start a first measurement of the location,
      acquire first information indicating the location from the first sensor,
      calculate, based on the first information, distances between the location of the first device and each of a plurality of installation locations associated with each of a plurality of objects, each of the plurality of objects being arranged virtually at each of a plurality of installation locations in a real space,
      control the second sensor to start a second measurement of the orientation when the distances indicate that any of the plurality of installation locations of the plurality of objects is included in a given range from the first device,
      acquire second information indicating the orientation from the second sensor,
      control the display to display an object, from among the plurality of objects, according to the first information and the second information, and
      control the second sensor not to execute the second measurement when the distances indicate that any of the plurality of installation locations of the plurality of objects is not included in the given range from the first device.

2. The system according to claim 1, wherein the processor is configured not to control the second sensor to suspend the second measurement when the distances indicate that any one of the plurality of installation locations of the plurality of objects is included in the given range from the first device.

3. The system according to claim 1, wherein
   the system includes a head mounted display and a display control device,
   the head mounted display is the second device, communicates with the display control device, and includes the second sensor and the display, and
   the display control device is the first device, and includes the first sensor and the processor.

4. The system according to claim 3, wherein the display is a non-transmissive head mounted display.

5. The system according to claim 4, wherein the display displays a chart that indicates the location, the orientation, and relationship between the location of the first device and installation locations of at least one of object from among the plurality of objects.

6. The system according to claim 5, wherein the chart is a radar chart.

7. The system according to claim 1, wherein the first device is the second device.

8. The system according to claim 1, wherein the plurality of objects corresponds to contents of augmented reality.

9. The system according to claim 8, wherein the object is displayed on the display when the object corresponding to the location and the orientation exists.

10. A method executed by a processor, the method comprising:
    acquiring location information indicating a location of a head mounted display;
    calculating, based on the location information, distances between the location of the head mounted display and each of a plurality of installation locations associated with each of a plurality of objects, each of the plurality of objects being arranged virtually at each of a plurality of installation locations in a real space;
    receiving sensor information including an orientation of the head mounted display from the head mounted display, the sensor information being measured by a sensor included in the head mounted display; and
    when the distances indicate that any of the plurality of installation locations of the plurality of objects is not included in a given range from the head mounted display, transmitting, to the head mounted display, a signal for controlling the sensor not to execute a measurement of the sensor information or not to transmit the sensor information.

11. The method according to claim 10, further comprising:
    when the determination result indicates that there is no object, a signal for performing one or more out of control by which an interval of a detection operation of the sensor is lengthened and control by which an interval of transmission of the sensor information is lengthened, compared with a case in which the determination result indicates that there is an object, is transmitted to the head mounted display.

12. A method executed by a computer, the method comprising:
    controlling a first sensor to start a first measurement of a location, the first sensor being configured to measure the location of a first device;
    acquiring first information indicating the location from the first sensor;
    calculating, based on the first information, distances between the location of the first device and each of a plurality of installation locations associated with each of a plurality of objects, each of the plurality of objects being arranged virtually at each of a plurality of installation locations in a real space;
    controlling a second sensor to start a second measurement of an orientation when a the distances indicate that any of the plurality of installation locations of the plurality of objects is included in a given range from the device, the second sensor being configured to measure the orientation of a second device;
    acquiring second information indicating the orientation from the second sensor;
    controlling a display to display an object, from among the plurality of objects, according to the first information and the second information; and
    controlling the second sensor not to execute the second measurement when the distances indicate that any of the plurality of installation locations of the plurality of objects is not included in the given range from the first device.

13. The method according to claim 12, further comprising:
    after the second sensor is controlled to start the second measurement, controlling the second sensor to suspend the second measurement when the distances indicate that any of the plurality of installation locations of the plurality of objects is not included in the given range from the first device.

14. The method according to claim 12, further comprising:

controlling the display to display a chart that indicates the location, the orientation, and relationship between the location of the first device and installation locations of at least one of object from among the plurality of objects.

15. The method according to claim 14, wherein the chart is a radar chart.

16. The method according to claim 12, wherein the plurality of objects corresponds to contents of augmented reality.

17. The method according to claim 16, wherein the object is displayed on the display when the object corresponding to the location and the orientation exists.

* * * * *